(12) United States Patent
Yonehara et al.

(10) Patent No.: US 11,007,911 B2
(45) Date of Patent: May 18, 2021

(54) SEAT BACK STRUCTURE

(71) Applicants: TS TECH CO., LTD., Asaka (JP); HONDA MOTOR CO., LTD., Tokyo (JP)

(72) Inventors: Hidetaka Yonehara, Shioya-gun (JP); Hisato Oku, Wako (JP); Kento Ota, Wako (JP)

(73) Assignees: TS TECH CO., LTD., Asaka (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/495,701

(22) PCT Filed: Mar. 20, 2018

(86) PCT No.: PCT/JP2018/010968
§ 371 (c)(1),
(2) Date: Sep. 19, 2019

(87) PCT Pub. No.: WO2018/174045
PCT Pub. Date: Sep. 27, 2018

(65) Prior Publication Data
US 2020/0094714 A1 Mar. 26, 2020

(30) Foreign Application Priority Data
Mar. 23, 2017 (JP) .............................. JP2017-056957

(51) Int. Cl.
*B60N 2/68* (2006.01)
*B60N 2/427* (2006.01)
(Continued)

(52) U.S. Cl.
CPC ....... *B60N 2/42709* (2013.01); *B60N 2/4228* (2013.01); *B60N 2/433* (2013.01); *B60N 2/686* (2013.01)

(58) Field of Classification Search
CPC .... B60N 2/433; B60N 2/42709; B60N 2/686; B60N 2/682; B60N 2/68
See application file for complete search history.

(56) References Cited

U.S. PATENT DOCUMENTS

| 9,415,709 B2* | 8/2016 | Ito ............................ B60N 2/22 |
| 2003/0127902 A1* | 7/2003 | Fujita .................... B60N 2/686 |
| | | 297/452.48 |

(Continued)

FOREIGN PATENT DOCUMENTS

| JP | 2001-178584 A | 7/2001 |
| JP | 2001-186957 A | 7/2001 |

(Continued)

OTHER PUBLICATIONS

Sep. 24, 2019 International Preliminary Report on Patentability issued in International Patent Application No. PCT/JP2018/010968.

(Continued)

*Primary Examiner* — Shin H Kim
(74) *Attorney, Agent, or Firm* — Oliff PLC

(57) ABSTRACT

A seat back structure includes, a seat back frame which includes a panel material and a frame material joined with the panel material; a side frame which is included in the frame material and which is positioned in at least one edge side in a width direction of the panel material; and a first vulnerable portion which is formed in the side frame and which deforms when a load from an impact is applied. The first vulnerable portion is a slit formed by cutting out the side frame in a horizontal direction.

9 Claims, 4 Drawing Sheets

(51) Int. Cl.
*B60N 2/433* (2006.01)
*B60N 2/42* (2006.01)

(56) References Cited

U.S. PATENT DOCUMENTS

| | | | |
|---|---|---|---|
| 2011/0025115 A1* | 2/2011 | Tanaka | B60N 2/686 297/391 |
| 2013/0015694 A1* | 1/2013 | Tosco | B60N 2/686 297/452.18 |
| 2015/0203000 A1* | 7/2015 | Fujita | B60N 2/4228 297/216.14 |
| 2016/0297339 A1* | 10/2016 | Tosco | B60N 2/682 |
| 2017/0158104 A1* | 6/2017 | Le | B64D 11/0638 |
| 2017/0368975 A1* | 12/2017 | Miyawaki | B60N 2/803 |
| 2018/0134188 A1* | 5/2018 | Niitsuma | B60N 2/002 |
| 2020/0017053 A1* | 1/2020 | Tay | B60N 2/78 |

FOREIGN PATENT DOCUMENTS

| | | |
|---|---|---|
| JP | 2007-186160 A | 7/2007 |
| JP | 2011-105049 A | 6/2011 |
| JP | 2011-246067 A | 12/2011 |
| JP | 2013-169832 A | 9/2013 |
| WO | 2014/033963 A1 | 3/2014 |

OTHER PUBLICATIONS

May 29, 2018 Search Report issued in International Patent Application No. PCT/JP2018/010968.

* cited by examiner

SEAT BACK STRUCTURE

TECHNICAL FIELD

The present invention relates to a seat back structure in a seat for a vehicle.

BACKGROUND ART

Conventionally, the Road Transport Vehicle Act determines the technical standard for structures and devices in an automobile in order to ensure safety and to protect the environment. As one standard, there is a safety standard for road transport vehicles. Such standard provides a method for testing the strength which a rear seat needs to protect passengers from luggage stored in a rear trunk when the automobile collides from the front and the luggage moves.

As a technique to satisfy such standard, there is a well-known technique described in patent literature 1, for example. The rear seat described in patent literature 1 includes a hinge mechanism which supports a seat back of a rear seat so that the seat back can be tilted to the front and the back with relation to a floor panel. Such hinge mechanism includes a portion which deforms according to a collision by luggage (block for testing) and which absorbs the impact when the luggage collides.

CITATION LIST

Patent Literature

Patent Document 1: JP 2007-186160A

SUMMARY OF INVENTION

Technical Problem

The portion which deforms in the above-described hinge mechanism includes a bracket which normally rotatably supports a rotating holding piece fixed to a seat back frame. Therefore, the deforming potion is not deformed unless the luggage stored in the trunk does not collide with the deforming portion directly and strongly.

The technical problem to be solved by the present invention is to allow the impact to be absorbed more easily when the luggage stored in the trunk collides strongly with the seat back.

Solution to Problem

In order to solve the above problems, according to aspect 1 of the present invention, a seat back structure includes: a seat back frame which includes a panel material and a frame material joined with the panel material; a side frame which is included in the frame material and which is positioned in at least one edge side in a width direction of the panel material; and a first vulnerable portion which is formed in the side frame and which deforms when a load from an impact is applied, wherein, the first vulnerable portion is a slit formed by cutting out the side frame in a horizontal direction.

According to aspect 2 of the present invention, in the seat back structure according to aspect 1, the side frame includes a side plate positioned on a side of the panel material and a rear plate extending from a rear edge of the side plate toward the panel material side, and the first vulnerable portion is formed by cutting out from the side plate to the rear plate.

According to aspect 3 of the present invention, in the seat back structure according to aspect 1, the side frame is linked to be rotatable through a rotating axis to a bracket fixed to a vehicle body side, and the first vulnerable portion is positioned higher than the rotating axis.

According to aspect 4 of the present invention, in the seat back structure according to aspect 1, the panel material includes a non-joining portion which is formed as a concave with relation to the frame material and which is not joined to the frame material, and the non-joining portion is to be a second vulnerable portion which is to be a point of origin where the panel material deforms when the load from the impact is applied.

According to aspect 5 of the present invention, in the seat back structure according to aspect 4, the second vulnerable portion is positioned higher than the first vulnerable portion.

According to aspect 6 of the present invention, in the seat back structure according to aspect 4, the second vulnerable portion is formed in a plurality of positions of the panel material in a height direction.

According to aspect 7 of the present invention, in the seat back structure according to aspect 4, the second vulnerable portion is formed in a plurality of positions of the panel material in a width direction.

According to aspect 8 of the present invention, in the seat back structure according to aspect 1, the frame material includes a plurality of vertical frame materials and a plurality of horizontal frame materials joined along a circumference edge of the panel material; and among the plurality of vertical frame materials, the side frame is joined as one with the vertical frame material positioned in at least one edge side in a width direction of the panel material.

According to aspect 9 of the present invention, in the seat back structure according to aspect 1, the seat back frame includes a first divided body and a second divided body divided between left and right, and the side frame is provided in at least one of an edge of the first divided body on the second divided body side or an edge of the second divided body on the first divided body side.

According to aspect 10 of the present invention, in the seat back structure according to aspect 1, the seat back frame is locked with relation to the vehicle body, and the lock position is positioned toward one edge in the width direction of the panel material.

Advantageous Effects of Invention

According to aspect 1 of the present invention, even if the luggage which moves from the back to the front does not collide with the frame material including the side frame, if the luggage collides with the panel material, the panel material deforms and the side frame bends and deforms with the first vulnerable portion which is the slit as the point of origin. Therefore, for example, when the luggage stored in the trunk strongly collides with the seat back, the impact can be absorbed.

According to aspect 2 of the present invention, the first vulnerable portion which is the slit is formed by cutting out the side frame from the side plate to the rear plate. Therefore, in the portion where the first vulnerable portion is formed, the corner of the side frame is formed cut out. Consequently, the portion where the first vulnerable portion is formed easily becomes the point of origin where the side frame deforms.

According to aspect 3 of the present invention, even if the seat back frame tilts to the front with the rotating axis as the center due to the impact of the luggage from behind, the side frame bends and deforms with the first vulnerable portion as the point of origin. Therefore, it is possible to suppress the seat back itself tilting too much to the front and the safety is enhanced.

According to aspect 4 of the present invention, the portion of the panel material where the non-joining portion is positioned is not joined to the frame material, and the stiffness is set to a low value compared to the portion where the frame material is joined. Since such non-joining portion is to be the second vulnerable portion, the panel material easily deforms with the second vulnerable portion as the point of origin. As a result, the impact is easily absorbed when the luggage stored in the trunk collides strongly with the seat back.

According to aspect 5 of the present invention, the second vulnerable portion is positioned higher than the first vulnerable portion. Therefore, for example, when the luggage stored in the trunk collides strongly with the seat back, the position of the panel material higher than the first vulnerable portion easily deforms.

According to aspect 6 of the present invention, the second vulnerable portion is formed in the plurality of positions in the panel material in the height direction. Therefore, for example, when the luggage stored in the trunk collides strongly with the seat back, the position of the panel material higher than the first vulnerable portion can be deformed in the plurality of portions.

According to aspect 7 of the present invention, the second vulnerable portion is formed in a plurality of positions of the panel material in the width direction. Therefore, for example, when the luggage stored in the trunk collides with the seat back strongly, the panel material can be deformed in the width direction.

According to aspect 8 of the present invention, among the plurality of vertical frame materials, the side frame is joined as one with the vertical frame material positioned in at least the one edge side of the panel material in the width direction. Therefore, when the side frame is deformed with the first vulnerable portion as the point of origin, the vertical frame material joined as one with the side frame is tilted and this can urge the panel material to deform.

According to aspect 9 of the present invention, the side frame is provided in at least one of the edge of the first divided body on the second divided body side or the edge of the second divided body on the first divided body side. Therefore, the first vulnerable portion is provided toward the center of the entire seat back frame. Consequently, even if the seat back frame is divided between the left and the right, the impact is easily absorbed when the luggage strongly collides with the seat back.

According to aspect 10 of the present invention, the seat back frame is locked with relation to the vehicle body, and the lock position is toward one edge of the panel material in the width direction. Therefore, the horizontal distance between the lock position and the position of the side frame where the first vulnerable portion is formed is short. Consequently, the positions are comparatively close in the horizontal direction. That is, the portion locked to the vehicle body is close to the portion where the impact is easily absorbed when the luggage is received. Therefore, the lock attached to the vehicle body is hardly released and the safety is enhanced.

DESCRIPTION OF EMBODIMENTS

The present embodiment is described below with reference to the drawings. The embodiments below include various limitations technically preferable to implement the embodiment, however, the technical scope of the present invention is not limited by the illustrated examples.

Overview of Vehicle Seat

Figure 1:
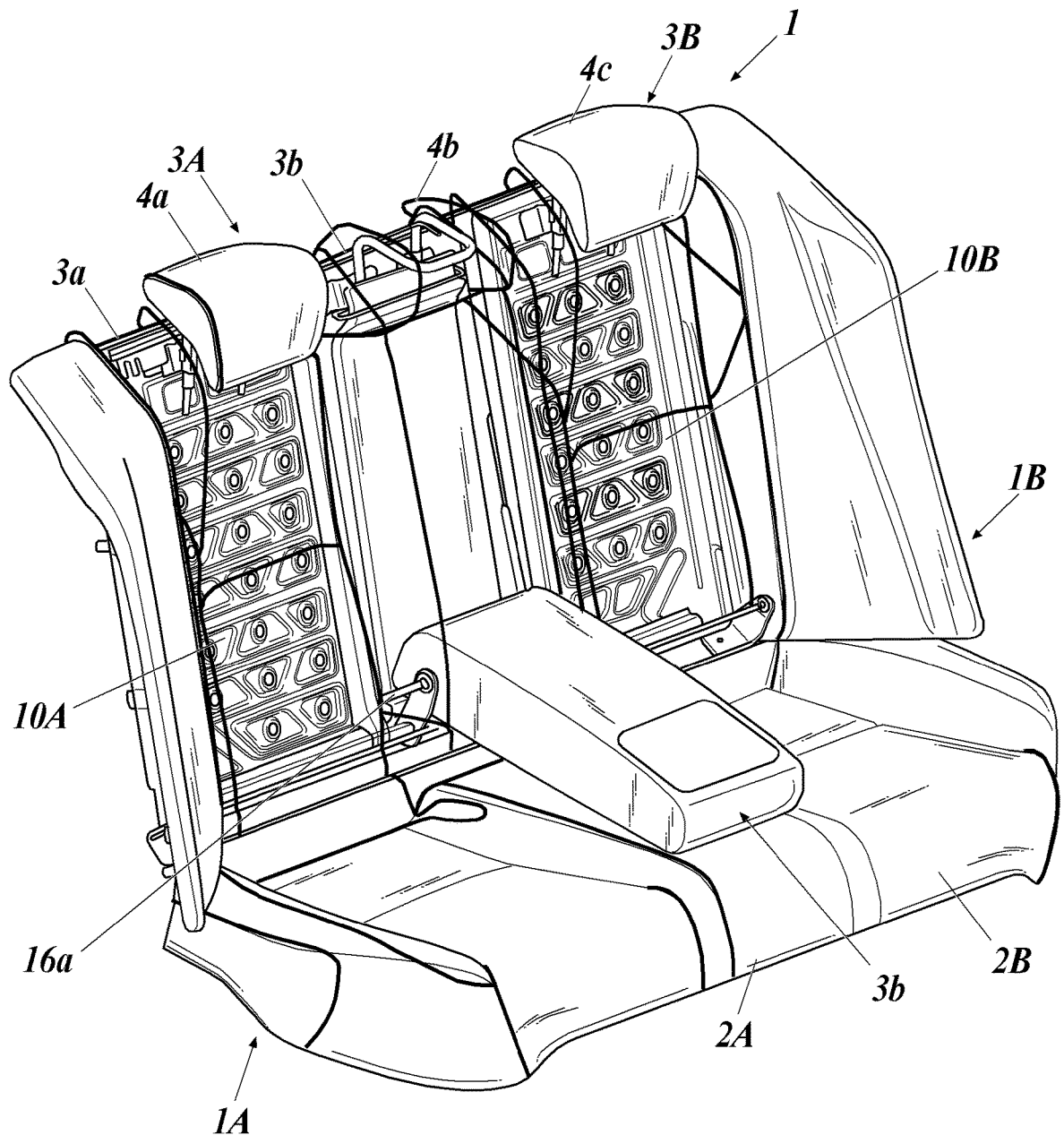
FIG. 1 is a perspective view showing a seat for a vehicle provided with a seat back.
Figure 1:
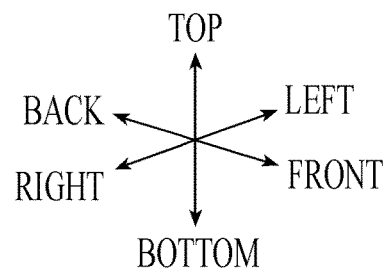

The reference numeral 1 shown in FIG. 1 shows a vehicle seat provided inside an automobile (vehicle) and the vehicle seat 1 according to the present embodiment is a rear sheet for three people. FIG. 1 displays a partial silhouette.

According to the present embodiment, various descriptions are provided based on the direction that the vehicle seat 1 is provided in the vehicle.

The vehicle seat 1 is divided so that the ratio between the left side and the right side is different. The vehicle seat 1 includes a right side seat 1A for two people positioned on the right side of the vehicle and a left side seat 1B for one person positioned on the left side of the vehicle.

The right side seat 1A includes a right side seat cushion 2A which receives buttocks of passengers when two people are seated and a right side seat back 3A which is a back rest for the passengers provided in a standing state at the rear edge of the right side seat cushion 2A. In such right side seat cushion 2A and right side seat back 3A, the cushioning provided inside an outer material may be formed unevenly or a seam of the outer material may correspond to a boundary of the unevenness in order to form regions to seat two people.

The left side seat 1B includes a left side seat cushion 2B which receives a buttock of one passenger and a left side seat back 3B which is a back rest for one passenger provided in a standing state at the rear edge of the left side seat cushion 2B.

According to the present embodiment, the vehicle seat 1 is divided so that the ratio between the left side and the right side is different, but the present embodiment is not limited to the above, and the vehicle seat 1 can be divided so that the ratio between the left side and the right side is the same.

Head rests 4a, 4b, and 4c which receive heads of the passengers are provided in the first seat back 3a and the second seat back 3b of the right side seat back 3A and the upper portion of the left side seat back 3B.

The right side seat back 3A and the left side seat back 3B include a reclining mechanism which is not shown so that the angle of the right side seat back 3A and the left side seat back 3B can be adjusted. The right side seat cushion 2A and the left side seat cushion 2B can be laid to the back, can stand towards the front, or can be locked to maintain a certain angle by using the reclining mechanism.

In the right side seat back 3A, the second seat back 3b positioned in the center of the vehicle seat 1 can be tilted toward the front around a rotating axis 16a as the center provided in the lower edge separate from the reclining mechanism. With this, the second seat back 3b functions as an arm rest when laid to the front as shown in FIG. 1.

Figure 2:
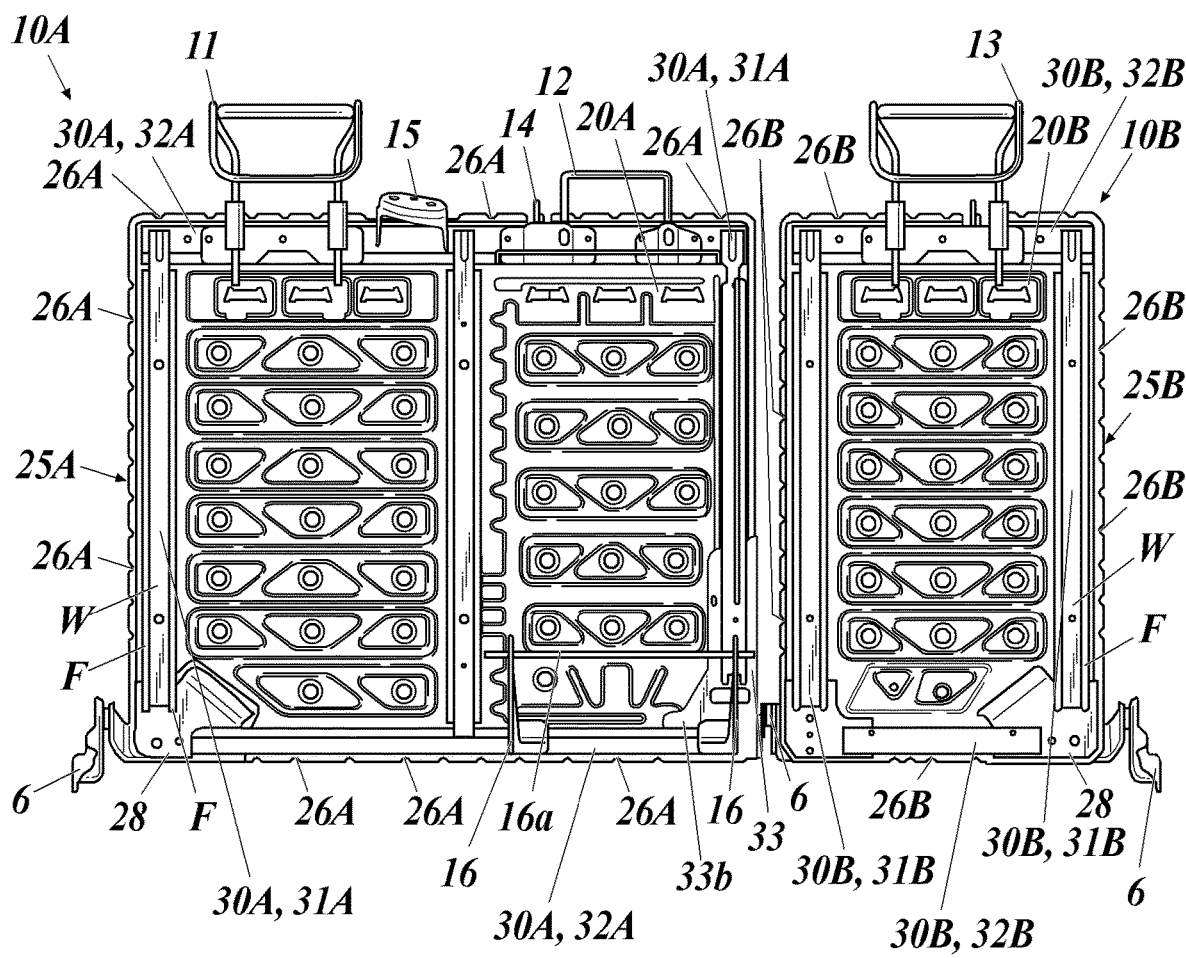
FIG. 2 is a front view of a seat back frame.
Figure 2:
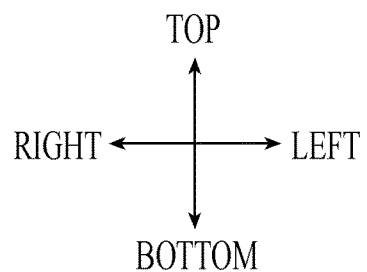

Each of the right side seat back 3A and the left side seat back 3B are made with seat back frames 10A and 10B as the frameworks as shown in FIG. 1 and FIG. 2.

Described in detail, since the vehicle seat 1 is divided between left and right, the seat back frame according to the present embodiment is also divided between left and right. The seat back frame includes a right side seat back frame 10A as a first divided body and a left side seat back frame 10B as a second divided body.

The right side seat back 3A and the left side seat back 3B are formed by providing a cushioning material on the seat back frames 10A and 10B and covering the above with an outer material. The above-described reclining mechanism is linked to the seat back frames 10A and 10B.

Each of the left and right seat back frames 10A and 10B includes a panel material 20A and 20B, and a frame material 30A and 30B linked to the panel material 20A and 20B.

The panel materials 20A and 20B (also called a pan frame) are a metallic plate including a steel or an aluminum alloy and are formed in a rectangular shape from a front view.

The panel material 20A is included in the right seat back 3A and is set in a width for two people.

The panel material 20B is included in the left seat back 3B and is set in a width for one person.

A space for joining a later-described plurality of frame materials 31A, 32A, 31B, and 32B by laser welding is prepared as a frame in the panel materials 20A and 20B, and a plurality of sections with a reinforcing structure to reinforce the panel materials 20A and 20B are formed in the portion surrounded by the frame materials 31A, 32A, 31B, and 32B.

As shown in FIG. 2, the sections with the reinforcing structure show portions of the panel materials 20A and 20B formed with unevenness in the front and back direction. A plurality of uneven shaped portions are formed in a substantial trapezoid, isosceles trapezoid, and a substantial parallelogram in each section. Forming a plurality of uneven portions in each section as described above results in a state with a bead corresponding to the plurality of uneven portions from a front view. This results in enhancing hardness.

The bead is a projecting (rail) structure formed projecting to the front from the front surface of the panel materials 20A and 20B. The metallic plate included in the panel materials 20A and 20B may be easily deformed by curving and twisting in a flat state. However, by forming the projecting bead by a plastic processing, the hardness can be enhanced to prevent deforming of the panel materials 20A and 20B.

Figure 3:
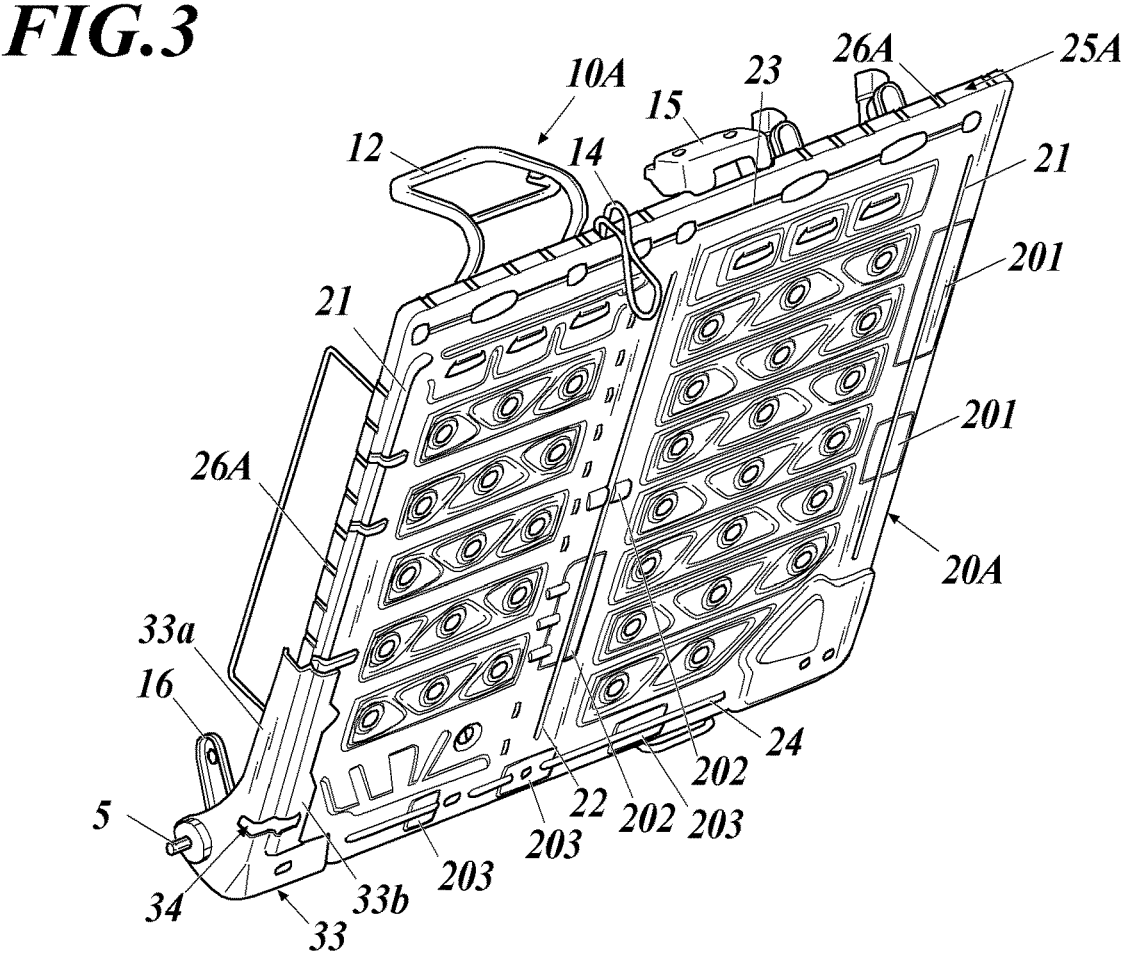
FIG. 3 is a portion of a rear perspective view of a seat back frame.

As shown in FIG. 2 and FIG. 3, the panel materials 20A and 20B include outer circumference flanges 25A and 25B formed by folding to the front outer circumference edges of the panel materials 20A and 20B. That is, the panel materials 20A and 20B are formed in a tray by folding the outer circumference edges as described above.

The outer circumference flanges 25A and 25B are formed to continue in at least the corner of the panel materials 20A and 20B. That is, although the outer circumference flanges 25A and 25B are formed along the outer circumference edges of the panel materials 20A and 20B, for example, there may be portions where the outer circumference flanges 25A and 25B are not formed in the outer circumference edge. Even if there are such portions, the outer circumference flanges 25A and 25B continue in at least the corner of the panel materials 20A and 20B.

As shown in FIG. 3B, the outer circumference flanges 25A and 25B are formed so that the outer circumference edges of the panel materials 20A and 20B are formed folded in a stair shape. With this, the corner of a later-described side frame 33 is also folded in a stair shape.

A plurality of outer circumference beads 26A . . . , 26B . . . , are formed in the outer circumference flanges 25A and 25B provided with intervals in between in a circumference direction of the panel materials 20A and 20B.

A plurality of vertical frame materials 31A and 31B and a plurality of horizontal frame materials 32A and 32B joined along the outer circumference edge in the front side of the panel materials 20A and 20B are included in the frame materials 30A and 30B, and such plurality of frame materials include metallic supporting rods such as a steel or an aluminum alloy.

All of the frame materials 31A, 32A, 31B, and 32B are formed with a hat tap frame material including a web portion W with a cross section in a substantial concave shape (or a cross section in a substantial gate shape, a cross section in a substantial U shape open toward the left, or a cross section in a substantial U shape) to form a closed cross section between the panel materials 20A and 20B and a flange portion F which is joined to the panel materials 20A and 20B and which is formed as one with the web portion W.

The flange portions F in the frame materials 31A, 32A, 31B, and 32B are joined to the panel materials 20A and 20B by laser welding.

The frame material 30A is included in the right side seat back 3A. The frame material 30A includes, a vertical frame material 31A attached to the left and right edges and the center of the front surface of the panel material 20A along the vertical direction and a horizontal frame material 32A attached to the upper and lower edges of the front surface of the panel material 20A along the horizontal direction.

In the right side seat back 3A, the vertical frame material 31A is attached to the center of the panel material 20A, and this divides the right side seat back 3A between the seating region on the first seat back 3a side and the seating region on the second seat back 3b side.

A head rest frame 11 included in the framework of the first head rest 4a corresponding to the first seat back 3a and a head rest frame 12 included in the framework of the second head rest 4b corresponding to the second seat back 3b are joined to the upper side of the horizontal frame material 32A by laser welding.

A striker 14 held by a lock mechanism (not shown) provided in the vehicle main body is joined to the upper side of the horizontal frame material 32A by laser welding.

Since the striker 14 is held by the lock mechanism, the posture of the seat back frame 10A is supported. That is, the seat back frame 10A is locked to the vehicle body.

The striker 14 is formed to extend from the horizontal frame material 32A on the upper side to the position of the lock mechanism. Described in detail, the striker 14 extends from the horizontal frame 32A on the upper side to the rear passing above the seat back frame 10A. That is, the lock mechanism is positioned to the rear of the seat back frame 10A.

The striker 14 according to the present embodiment is joined to the horizontal frame material 32A on the upper side on the second seat back 3b side in the right side seat back 3A. That is, the lock mechanism is positioned on the second seat back 3b side in the right side seat back 3A.

A seatbelt attaching portion 15 is joined to the horizontal frame material 32A on the upper side by laser welding. The seatbelt for the passenger sitting in the center of the vehicle seat 1 is attached to the seatbelt attaching unit 15. The seat belt attaching unit 15 is formed to project upward and forward from the horizontal frame material 32A on the upper side, and the seatbelt can be easily attached.

A pair of armrest brackets 16 and 16 are joined by laser welding to the horizontal frame material 32A on the lower side. As described above, the second seat back 3b functions as the arm rest which can tilt to the front around the rotating axis 16a provided in the lower edge as the center, and which can be used from the left and the right. The pair of arm rest brackets 16 and 16 support the second seat back 3b (arm rest) to be rotatable.

The frame material 30B is included in the left side seat back 3B and includes the vertical frame 31B attached to both the left and right edges of the front surface of the panel material 20B along the vertical direction and the horizontal frame material 32B attached to both the upper and lower edges of the front surface of the panel material 20B along the horizontal direction.

The left side seat back 3B is for one person, and the seating region does not need to be divided by the vertical frame material as shown in the right side seat back 3A.

The head rest frame 13 included in the framework of the third head rest 4c corresponding to the left side seat back 3B is joined to the horizontal frame material 32B on the upper side by laser welding.

Configuration of Seat Back Frame in Right Side Seat Back

Next, the configuration of the right side seat back frame 10A as a first divided body is described in detail.

The seat back frame 10A includes a panel material 20A as described above and a plurality of vertical frame materials 31A and a plurality of horizontal frame materials 32A joined to a peripheral edge of the panel material 20A.

The upper edge of the plurality of vertical frame materials 31A is joined to the horizontal frame material 32A on the upper side by laser welding, and the lower edge of the center vertical frame material 31A is joined to the horizontal frame material 32A on the lower side by laser welding.

As shown in FIG. 3, the side frame 33 is provided as one with the lower edge of one edge (left side) of the panel material 20A in the width direction. As shown in FIG. 2, the reinforcing panel 28 is provided as one with the lower edge of the other edge (right side) in the width direction.

The reinforcing panel 28 is a panel thicker than a thickness of the panel material 20A to reinforce the lower right corner in the panel material 20A. The lower edge of the vertical frame material 31A on the right side of the panel material 20A and the right side edge of the horizontal frame material 32A on the lower side are joined as one with the reinforcing panel 28.

There is a joining space in the lower right corner of the panel material 20A to join the reinforcing panel 28, and the joining space is formed shaped like the reinforcing panel 28.

The side frame 33 is a frame material formed to be long along a length direction of the vertical frame material 31A on the left side of the panel material 20A. The side frame 33 includes a side plate 33a positioned on the side of the panel material 20A and a rear plate 33b extending from the rear edge of the side plate 33a to the panel material 20A side.

The lower edge of the vertical frame material 31A on the left side of the panel material 20A and the left side edge of the horizontal frame material 32A on the lower side are joined as one to the side frame 33.

Different from the above-described panel material 20A, the side frame 33 is formed in an angle including the side plate 33a and the rear plate 33b, and is formed to be long along the length direction of the vertical frame material 31A. Therefore, although the side frame 33 is joined as one to the panel material 20A, the side frame 33 is included in the frame material 30A together with the plurality of vertical frame materials 31A and the plurality of horizontal frame materials 32A.

There is a joining space in the lower left corner of the panel material 20A to join the side frame 33.

As described above, the side frame 33 is provided in the edge of the right side seat back frame 10A on the side of the left side seat back frame 10B (left side edge of the seat back frame 10A). However, the embodiment is not limited to the above, and the side frame 33 can be provided in the right side edge of the right side seat back frame 10A.

For example, when a wheel well surrounding a rear wheel of the vehicle is provided in each of the left and right side of a rear trunk of the vehicle seat 1 in a projected state, instead of providing the side frame 33 in the right side edge of the seat back frame 10A, by providing the side frame 33 in the left side edge of the seat back frame 10A, the effect of absorbing the shock is enhanced.

The side frame 33 can be provided in the left and right edges of the seat back frame 10A.

Figure 4:
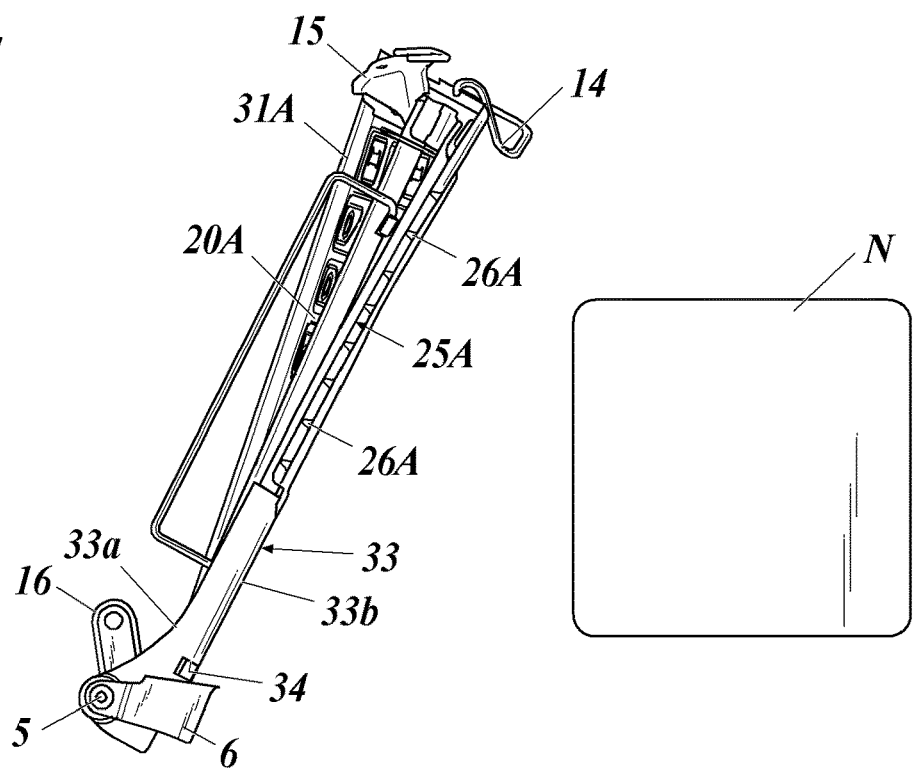
FIG. 4 is a side view showing a state before luggage moves.

As shown in FIG. 3 and FIG. 4, the side plate 33a is formed so that the plate becomes wider toward the lower edge, and the plate expands toward the front. A rotating axis 5 included in the reclining mechanism passes the wide lower edge.

The rotating axis 5 is positioned to penetrate through the lower edge of the right side seat back 3A in the horizontal direction and enables the reclining movement of the entire right side seat back 3A.

The brackets 6 fixed to the vehicle body side are provided in the following positions, the right side edge in the lower edge of the right side seat back 3A, the left side edge in the lower edge of the left side seat back 3B, and the position between the lower edge of the right side seat back 3A and the lower edge of the left side seat back 3B. The rotating axis 5 is positioned to penetrate the brackets. The position where the bracket 6 is fixed can be any place toward the vehicle body side than the right side seat back 3A and the left side seat back 3B. Specifically, the position can be the floor panel included in a floor of the vehicle body, or can be the right side seat cushion 2A and the left side seat cushion 2B.

That is, the right side seat back 3A and the left side seat back 3B are linked to be rotatable with relation to the brackets 6 fixed to the vehicle body side through the rotating axis 5. The right side seat back 3A and the left side seat back 3B are rotatable with relation to the brackets 6 and the angles of the right side seat back 3A and the left side seat back 3B can be adjusted by the reclining mechanism.

In more detail, the side frame 33 positioned in the lower edge of the right side seat back 3A is linked to be rotatable with relation to the bracket through the rotating axis.

A first vulnerable portion 34 which deforms when an impact load is applied from the rear is formed in the side frame 33 itself or the right side seat back 3A including the side frame 33.

The impact load from the rear refers to a load which comes into strong contact with the vehicle seat 1 when luggage N, etc. stored in the trunk behind the vehicle seat 1 moves at the point of a front collision of the automobile, for example. An experiment which assumes such situation can also reproduce the luggage N, etc. moving to the front and coming into strong contact with the vehicle seat 1.

As shown in FIG. 3, the first vulnerable portion 34 is a slit formed by cutting out the side frame 33 in the horizontal direction.

Described in detail, the first vulnerable portion 34 which is a slit is formed by cutting out a portion from the side plate 33a to the rear plate 33b. That is, the corner of the side frame 33 is cutout to form the first vulnerable portion 34.

The shape of the slit according to the present embodiment is a shape forming a corner (that is, a rectangular slit), but the shape is not limited to the above and can be a bent shape without a corner (that is, a slit shaped in a long hole or a rectangle without corners).

The side frame 33 is set to deform by bending to the rear due to the first vulnerable portion 34 which is a slit being crushed and deforming.

The first vulnerable portion 34 is positioned higher than the rotating axis 5. With this, even if the right side seat back frame 10A tilts forward with the rotating axis 5 as the center due to the impact of the luggage N from the rear, the side frame 33 bends and deforms with the first vulnerable portion 34 as the point of origin.

The position of the side frame 33 and the lock position of the vehicle seat 1 are positioned in a comparatively close position in the horizontal direction. That is, as described above, the right side seat back frame 10A is locked to the vehicle body through the striker 14, and the lock position is toward one edge in the width direction of the panel material 20A (second seat back 3b side). Therefore, the horizontal distance between the lock position and the position of the side frame 33 where the first vulnerable portion 34 is formed is short.

That is, the position of the lock (striker 14) which cannot be released from the viewpoint of safety and the position of the side frame 33 which deforms when the impact load is applied from the rear are close in the horizontal direction.

Second vulnerable portions 201 and 202 are formed in the panel material 20A.

Described in detail, the panel material 20A includes non-joining portions 201, 202, and 203 which are formed as a concave with relation to the frame material 30A so as not to be joined to the frame material 30A. Such non-joining portions 201, 202, and 203 are to be the second vulnerable portions as the point of origin where the panel material 20A deforms when the impact load is applied.

As shown in FIG. 3, the non-joining portions 201, 202, and 203 are formed in the space where the plurality of frame materials 31A and 32A are joined by laser welding in the panel material 20A.

Two non-joining portions 201 are formed aligned vertically in the space in the right side edge of the panel material 20A where the vertical frame material 31A is joined. The two non-joining portions 201 are positioned higher than the first vulnerable portion 34.

Two non-joining portions 202 are formed aligned vertically in the space in the center of the panel material 20A where the vertical frame material 31A is joined. The two non-joining portions 202 are positioned higher than the first vulnerable portion 34.

Three non-joining portions 203 are formed aligned horizontally in the space in the lower edge of the panel material 20A where the horizontal frame material 32A is joined.

That is, the non-joining portions 201, 202, and 203 which are the second vulnerable portions include portions which are positioned higher than the first vulnerable portion 34 (non-joining portions 201, 202).

The second vulnerable portions 201, 202, and 203 are formed in the panel material 20A in the plurality of positions in the height direction. That is, the second vulnerable portions 201 and 202 along the vertical frame material 31A are formed so that two are aligned vertically. Viewing the entire panel material 20A, the second vulnerable portions 201 and 202 are formed in the panel material 20A in positions with a height different from the second vulnerable portion 203 in the height direction.

Further, the second vulnerable portions 201, 202, and 203 are formed in a plurality of positions in the panel material 20A in the width direction. That is, the second vulnerable portions 203 along the horizontal frame material 32A are formed so that 3 are aligned horizontally. Viewing the entire panel material 20A, the second vulnerable portions 201 are formed in the panel material 20A in positions different from the second vulnerable portions 202 in the width direction.

It is preferable to form the non-joining portions 201, 202, and 203 as described above in the panel material 20A, because noise which occurs due to the contact between the panel material 20A and the frame materials 31A and 32A can be suppressed.

The non-joining portions according to the present embodiment are formed in the space where the vertical frame material 31A in the right side edge is joined, in the space where the vertical frame material 31A in the center is joined and the space where the horizontal frame material 32A in the lower edge is joined. Alternatively, the non-joining portions can be formed in the space where the vertical frame material 31A in the left edge is joined.

In this case, the first vulnerable portion 34 is aligned with the second vulnerable portion in the vertical direction. Therefore preferably, sufficient consideration is made for the stiffness in the left side edge of the seat back frame 10A.

As shown in FIG. 3, in the panel material 20A, first to fourth beads 21 to 24 are formed in the position opposed to the vertical and horizontal frame materials 31A and 32A to reinforce the panel material 20A.

The first bead 21 is formed along the vertical frame material 31A provided in the left and right edges of the panel material 20A.

The second bead 22 is formed along the vertical frame material 31A provided in the center of the panel material 20A.

The third bead 23 is formed along the horizontal frame material 32A provided in the upper edge of the panel material 20A.

The fourth bead 24 is formed along the horizontal frame material 32A provided in the lower edge of the panel material 20A.

Such first to fourth beads 21 to 24 project to a web W side (that is, front) of the frame materials 31A and 32A which are a hat type frame material.

According to the above-described configuration, the panel material 20A is reinforced by the frame materials 31A and 32A, and the panel material 20A is reinforced by the beads 21 to 24. With this, the stiffness of the seat back frame 10A is enhanced synergistically by the frame materials 31A and 32A and the beads 21 to 24. Since the stiffness of the seat back frame 10A is enhanced, it is possible to suppress noise caused by insufficient stiffness and noise due to vibration when the vehicle is moving.

The configuration of the first vulnerable portion and the second vulnerable portions 201, 202, and 203 according to the present embodiment is applied to the seat back frame 10A in the right side seat back 3A, but the embodiments are not limited to the above. That is, the configuration can be applied to the seat back frame 10B in the left side seat back 3B or can be applied to both the right side seat back frame 10A and the left side seat back frame 10B.

Operation of Seat Back Frame

Next, the operation of the seat back frame 10A as described above is described with reference to FIG. 4 to FIG. 6. That is, described below is the operation and the state of the seat back frame 10A when the automobile collides from the front and the luggage N, etc. stored in the trunk behind the vehicle seat 1 moves to come into strong contact with the vehicle seat 1, for example.

The luggage N is set to a certain size and weight. When an experiment in which the luggage N collides with the vehicle seat 1 is performed, an experiment block is used as the luggage N. The experiment block has a size of 300 mm×300 mm×300 mm, all terminals and corners are chamfered at 20 mm and the weight is 18 kg.

Figure 5:
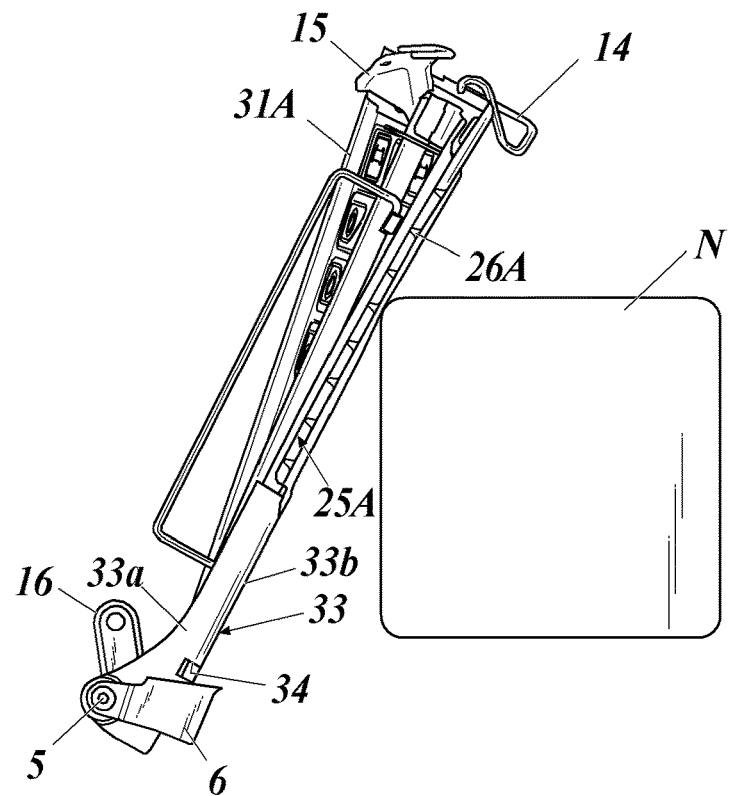
FIG. 5 is aside view showing a state in which the luggage moves and comes into contact with the seat back.

As shown in FIG. 4, the luggage N is placed on the floor panel of the trunk behind the vehicle seat 1. When the experiment is performed, the vehicle runs forward at about 50 km per hour and then collides to an obstacle in front of the vehicle. At this time, the luggage N is moved to the front as shown in FIG. 5.

Figure 6:
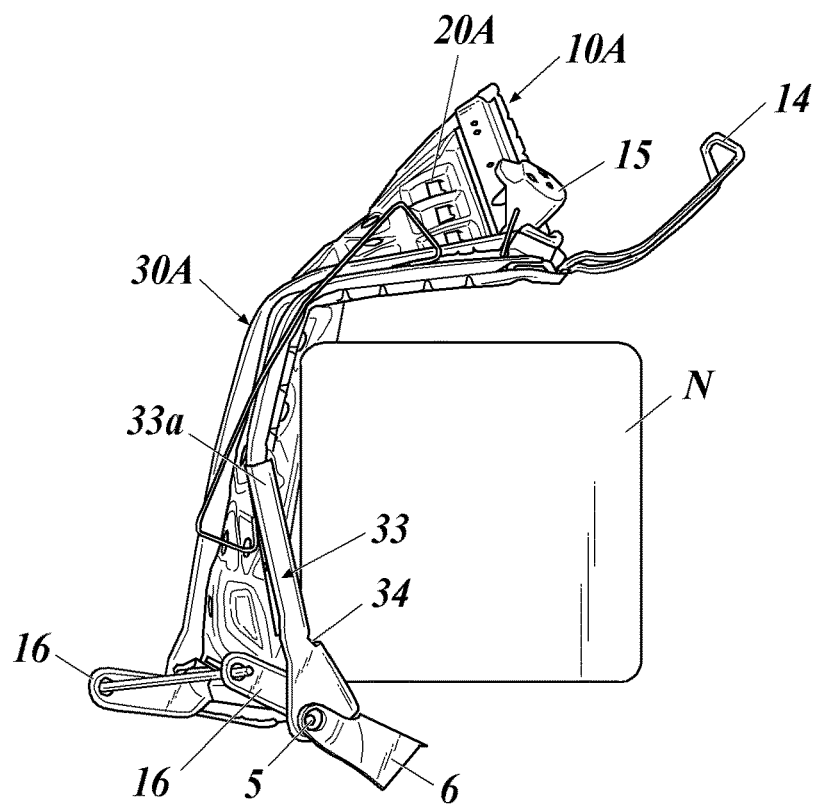
FIG. 6 is a side perspective view showing a state deformed by the luggage which came into contact.

When the luggage N comes into strong contact with the vehicle sheet 1 when the vehicle collides at the front, the seat back frame 10A is deformed as shown in FIG. 6.

When the luggage N comes into strong contact with the vehicle seat 1, the seat back frame 10A starts to tilt forward with the rotating axis 5 as the center. At the same time, the panel material 20A starts to deform and then the frame material 30A also starts to deform. Here, the striker 14 held by the lock mechanism starts to deform to an elongated manner.

Since the seat back frame 10A tilts forward with the striker 14 held by the lock mechanism, the frame material 30A is deformed by the first vulnerable portion 34 formed in the side frame 33 being crushed and deformed and the vertical frame material 31A joined to the side frame 33 tilting to the rear.

The panel material 20A starts deforming by expanding to the front mainly in the portion where the luggage N collides. Followed by the above, the second vulnerable portions 201, 202, and 203 which have lower stiffness than other portions start to deform. The second vulnerable portions 201, 202, and 203 are formed in the plurality of positions of the panel material 20A in the height direction and in the plurality of positions of the panel material 20A in the width direction. Therefore, the panel material 20A gradually deforms from the portion where the luggage N collides and the portions where the second vulnerable portions 201, 202, and 203 are formed.

The positions of the second vulnerable portions 201, 202, and 203 are not joined to the frame materials 31A and 32A and the panel material 20A. Therefore, the stiffness is set to a low value compared to the portions joined to the panel material 20A. Therefore, the frame materials 31A and 32A also deform from the portions facing the second vulnerable portions 201, 202, and 203.

As described above, while the striker 14 maintains the state held by the lock mechanism, the panel material 20A and the frame material 30A are deformed with the first vulnerable portion 34 and the second vulnerable portions 201, 202, and 203 as the point of origin. Therefore, it is possible to effectively scatter the impact load and to absorb the impact when the luggage N collides.

Although the right side seat back 3A tilts to the front with the rotating axis 5 as the center, the striker 14 is held by the lock mechanism and the right side seat back 3A does not fall completely to the front. Therefore, the safety is enhanced.

When the configuration of the first vulnerable portion 34 and the second vulnerable portions 201, 202, and 203 is applied to the left side seat back frame 10B, the operation the same as in the right side seat back frame 10A described above is performed in the left side seat back frame 10B also.

According to the present embodiment, for example, even if the luggage N moving from the rear to the front does not collide with the frame material 30A including the side frame 33, if the luggage N collides with the panel material 20A, the panel material 20A is deformed, and with this, the side frame 33 bends and deforms with the first vulnerable portions 34 which is the slit as the point of origin. Therefore, for example, when the luggage N stored in the trunk strongly collides with the seat back 3A, the impact can be easily absorbed.

The first vulnerable portion 34 which is a slit is formed by cutting out the side frame 33 from the side plate 33a to the rear plate 33b. Therefore, in the portion where the first vulnerable portion 34 is formed, the corner of the side frame 33 is formed cut out. Consequently, the portion where the first vulnerable portion 34 is formed tends to be the point of origin where the side frame 33 is deformed.

Even if the seat back frame 10A tilts to the front with the rotating axis 5 as the center due to the collision of the luggage N from the rear, the side frame 33 is deformed bent with the first vulnerable portion 34 as the point of origin. Therefore, it is possible to suppress the seat back 3A itself tilting too much to the front and the safety is enhanced.

The portions of the panel material 20A where the non-joining portions 201, 202, and 203 are positioned are not joined to the frame material 30A (31A, 32A). Therefore, the stiffness is set to be low compared to the portions joined to the frame material 30A (31A, 32A). Since such non-joining portions 201, 202, and 203 are to be the second vulnerable portions, the panel material 20A is deformed with the second vulnerable portions 201, 202, and 203 as the point of origin. As a result, for example, when the luggage N stored in the trunk collides strongly with the seat back 3A, the impact can be easily absorbed.

The second vulnerable portions 201 and 202 are positioned higher than the first vulnerable portion 34. Therefore, for example, when the luggage N stored in the trunk collides strongly with the seat back 3A, the position of the panel material 20A higher than the first vulnerable portion 34 can be easily deformed.

The second vulnerable portions 201, 202, and 203 are formed in the plurality of positions of the panel material 20A in the height direction. Therefore, for example, when the luggage N collides strongly with the seat back 3A stored in the trunk, the plurality of positions in the panel material 20A higher than the first vulnerable portion 34 can be deformed.

The second vulnerable portions 201, 202, and 203 are formed in the plurality of positions in the panel material 20A in the width direction. Therefore, for example, when the luggage N stored in the trunk collides with the seat back 3A strongly, the panel material 20A can be deformed in the width direction.

The side frame 33 is linked as one to at least the vertical frame material 31A positioned on one edge side in the width direction of the panel material 20 among the plurality of vertical frame materials 31A. Therefore, when the side frame 33 is deformed with the first vulnerable portion 34 as the point of origin, the vertical frame material 31A joined as one with the side frame 33 is tilted and this urges the panel material 20A to deform.

The side frame 33 is provided in the edge of the right side seat back frame 10A on the side of the left side seat back frame 10B or the edge of the left side seat back frame 10B on the side of the right side seat back frame 10A. Therefore, the first vulnerable portion 34 is provided to the center of the entire seat back frames 10A and 10B. Therefore, even if the seat back frames 10A and 10B are divided in the left portion and the right portion, the impact is easily absorbed when the luggage N collides strongly with the seat backs 3A and 3B.

The seat back frame 10A is in a locked state with relation to the vehicle body, and the locked position is toward one edge side in the width direction of the panel material 20A. Therefore, the horizontal distance is short between the lock position and the position of the side frame 33 in which the first vulnerable portion 34 is formed, and the positions are comparatively close in the horizontal direction. That is, the portion locked to the vehicle body is close to the portion where the impact received from the luggage N is easily absorbed. Therefore, the lock to the vehicle body is not easily released and the safety is enhanced.

INDUSTRIAL APPLICABILITY

The seat back structure according to the present invention easily absorbs impact when the luggage stored in the trunk collides strongly with the seat back, and therefore the industrial applicability is high.

REFERENCE SIGNS LIST 1 vehicle seat
1A right side seat
1B left side seat
2A right side seat cushion
2B left side seat cushion
3A right side seat back
3a first seat back
3b second seat back
3B left side seat back
5 rotating axis
6 bracket
10A seat back frame
14 striker
10B seat back frame
20A panel material
20B panel material
201 non-joining portion
202 non-joining portion
203 non-joining portion
30A frame material
30B frame material
31A vertical frame material
31B vertical frame material
32A horizontal frame material
32B horizontal frame material
33 side frame
33a side plate
33b rear plate
34 first vulnerable portion
N luggage

The invention claimed is:
1. A seat back structure comprising:
a seat back frame which includes a panel material and a frame material joined with the panel material;
a side frame which is included in the frame material and which is positioned in at least one edge side in a width direction of the panel material; and
a first vulnerable portion which is formed in the side frame and which deforms when a load from an impact is applied, wherein:
the first vulnerable portion is a slit formed by cutting out the side frame in a horizontal direction,
the panel material includes a non-joining portion which is formed as a concave with relation to the frame material and which is not joined to the frame material,
the non-joining portion is to be a second vulnerable portion which is to be a point of origin where the panel material deforms when the load from the impact is applied, and
the second vulnerable portion is formed in a plurality of positions of the panel material in a height direction.

2. The seat back structure according to claim 1, wherein, the side frame includes a side plate positioned on a side of the panel material and a rear plate extending from a rear edge of the side plate toward the panel material side, and
the first vulnerable portion is formed by cutting out from the side plate to the rear plate.

3. The seat back structure according to claim 1, wherein, the side frame is linked to be rotatable through a rotating axis to a bracket fixed to a vehicle body side, and
the first vulnerable portion is positioned higher than the rotating axis.

4. The seat back structure according to claim 1, wherein the second vulnerable portion is positioned higher than the first vulnerable portion.

5. The seat back structure according to claim 1, wherein the second vulnerable portion is formed in a plurality of positions of the panel material in a width direction.

6. The seat back structure according to claim 1, wherein, the frame material includes a plurality of vertical frame materials and a plurality of horizontal frame materials joined along a circumference edge of the panel material; and
among the plurality of vertical frame materials, the side frame is joined as one with the vertical frame material positioned in at least one edge side in a width direction of the panel material.

7. The seat back structure according to claim 1, wherein, the seat back frame includes a first divided body and a second divided body divided between left and right, and
the side frame is provided in at least one of an edge of the first divided body on the second divided body side or an edge of the second divided body on the first divided body side.

8. The seat back structure according to claim 1, wherein, the seat back frame is locked with relation to the vehicle body, and
the lock position is positioned toward one edge in the width direction of the panel material.

9. A seat back structure comprising:
a seat back frame which includes a panel material and a frame material joined with the panel material;
a side frame which is included in the frame material and which is positioned in at least one edge side in a width direction of the panel material; and
a first vulnerable portion which is formed in the side frame and which deforms when a load from an impact is applied, wherein:

the first vulnerable portion is a slit formed by cutting out the side frame in a horizontal direction, the panel material includes a non-joining portion which is formed as a concave with relation to the frame material and which is not joined to the frame material, the non-joining portion is to be a second vulnerable portion which is to be a point of origin where the panel material deforms when the load from the impact is applied, and the second vulnerable portion is formed in a plurality of positions of the panel material in a width direction.

\* \* \* \* \*